United States Patent [19]
Yoo

[11] Patent Number: 5,213,007
[45] Date of Patent: May 25, 1993

[54] STEERING WHEEL COVER ASSEMBLY

[76] Inventor: Tae Woo Yoo, 807, 1-Dong, Hanyang APT, San 189-1, Seocho-dong, Seocho-ku, Seoul, Rep. of Korea

[21] Appl. No.: 762,874

[22] Filed: Sep. 19, 1991

[30] Foreign Application Priority Data

Jan. 11, 1991 [KR] Rep. of Korea ............ 1991 249

[51] Int. Cl.$^5$ .............................................. B62D 1/06
[52] U.S. Cl. ........................................ 74/558; 74/552; 74/558.5
[58] Field of Search ................... 74/552, 558, 558.5

[56] References Cited

U.S. PATENT DOCUMENTS

| | | | |
|---|---|---|---|
| 1,538,147 | 5/1925 | Trench et al. | 74/558 |
| 1,876,993 | 9/1932 | Manning | 74/558 |
| 1,978,105 | 10/1934 | Flanagan | 74/558 |
| 1,984,033 | 12/1934 | Ritchie | 74/558 |
| 2,618,987 | 11/1952 | Goldstine | 74/558 |
| 3,312,124 | 4/1967 | Meier | 74/558 |
| 3,489,031 | 1/1970 | Meier | 74/558 |
| 3,726,152 | 4/1973 | Tsuneizumi | 74/552 |
| 4,800,776 | 1/1989 | Strongwater | 74/558 |

Primary Examiner—Richard E. Chilcot, Jr.
Assistant Examiner—Winnie Yip
Attorney, Agent, or Firm—Felfe & Lynch

[57] ABSTRACT

A steering wheel cover is provided comprising an arcuate metal segment having a multiplicity of protrusions and an array of transverse slots disposed along a length of the metal segment. Such metal segment is held in place around a limited length of the wheel cover by means of rivets which also serve as eyelets. The transverse slots facilitate flexural deformation of the metal segment in compliance with the radius of curvature of the wheel cover. Further, the protrusions formed on the surface of the metal segment serve to massage the palm of the automotive driver, thereby promotion circulation of the bodily blood.

4 Claims, 2 Drawing Sheets

STEERING WHEEL COVER ASSEMBLY

BACKGROUND OF THE INVENTION

The present invention relates to a steering wheel cover assembly for use in automotive vehicles, and more particularly to an annular wheel cover having arcuate metal segments adapted to be held in place around the wheel cover with a circumferentially spaced relationship.

The arcuate metal segments are formed from sheet metal and provided with a multiplicity of small protrusions functioning to therapeutically massage palm regions of the human body.

It is conventional in the automobile industry to make use of wheel covers in order to minimize or avoid any slipping between the outer surface of the steering wheel and the palm of the automobile driver. State-of-the art wheel covers are typically equipped with arcuate metal segments extending circumferentially along a limited length of the cover.

A multiplicity of protrusions are formed on the metal segment in such a desired pattern as to enhance anti-slipping effect. Then, the metal segment is subjected to rolling operation to form an elongate wrap-around member of interrupted circular cross-section. The member is finally flexed to conform to the curvature of the steering wheel as it is secured to the wheel cover by means of rivetting, bonding and the like. However, such a prior art wheel cover as stated above was disadvantageous in that a plethora of radial pleats or wrinkles are necessarily produced along the circumference of the metal segment in the course of bending and then securing the metal segment to the wheel cover. These wrinkles tend to provide the automobile driver with poor feeling, which may jeopardize safe driving of the automotive vehicle in the worst circumstance. Furthermore, the plethora of wrinkles may weaken or limit the ability of the metal segment to retain its engagement with the wheel cover, thereby causing the metal segment to be separated from the cover.

SUMMARY OF THE INVENTION

An object of the present invention is to provide a steering wheel cover capable of overcoming the problems and disadvantages encountered in the prior art wheel cover as discussed above. With this object in view, there is provided a steering wheel cover for automotive vehicles including a pair of radial inner edges with a circumferential opening therebetween to accommodate the steering wheel and a plurality of eyelets distributed along and in the vicinity of the radial edges. An arcuate metal segment is adapted to be held in place around the wheel cover, the metal segment having a pair of radial inner edges, a multiplicity of protrusions projecting in an outward direction from the surface of the metal segment and a plurality of eyelets distributed at the same interval as that of the eyelets of the wheel cover. An array of transverse slots are formed along the length of the metal segment at a substantially uniform interval, each of the transverse slots terminating in the vicinity of the radial inner edges of the metal segment.

DETAILED DESCRIPTION OF THE PREFERRED EMBODIMENT

Figure 1:
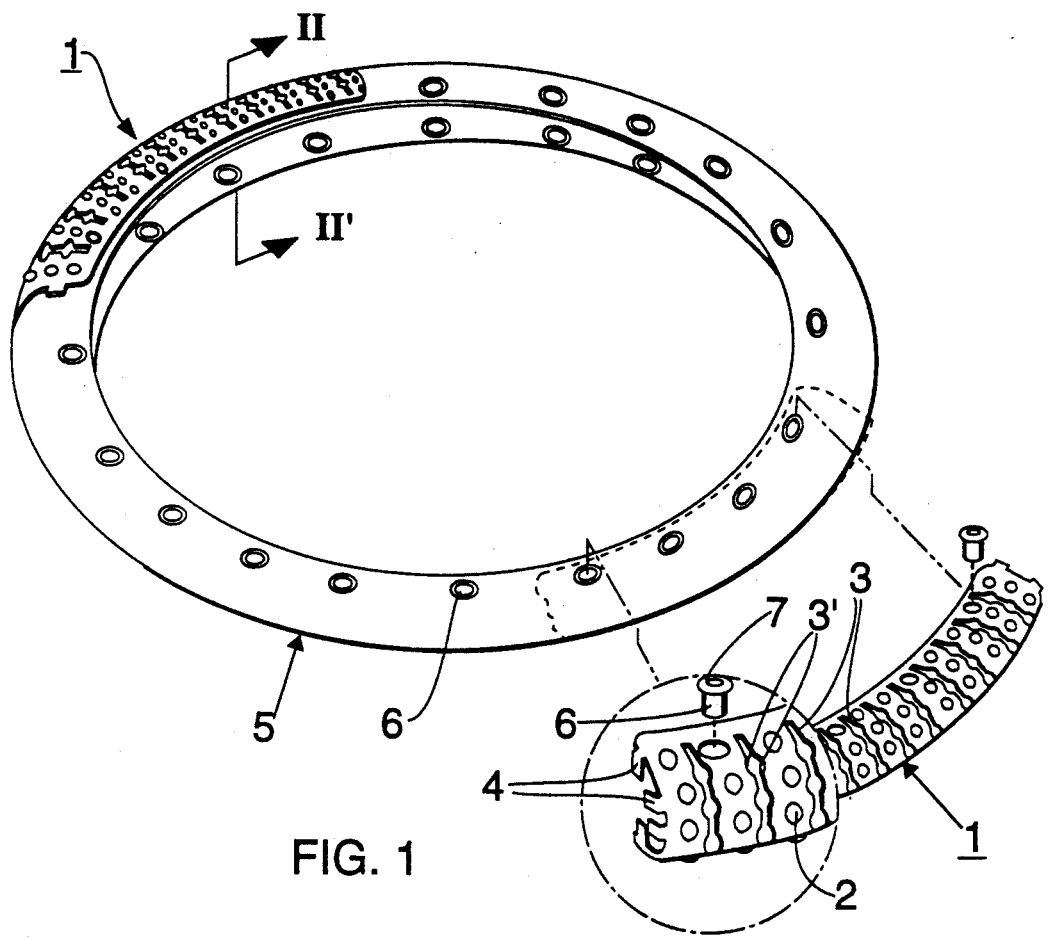
FIG. 1 is an exploded perspective view of the steering wheel cover in accordance with the present invention with a portion of the metal segment enlarged for clarity.
Figure 2:
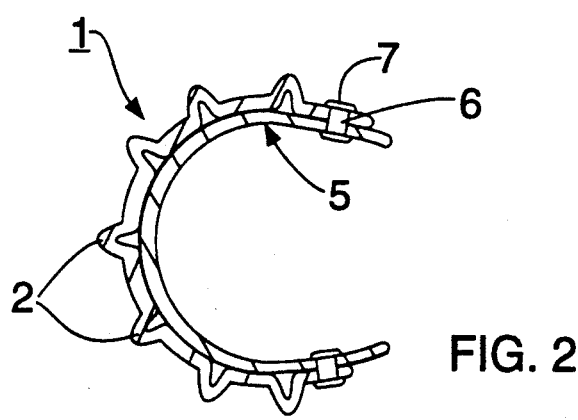
FIG. 2 is a cross-sectional view taken along the line A—A, of FIG. 1.
Figure 3:
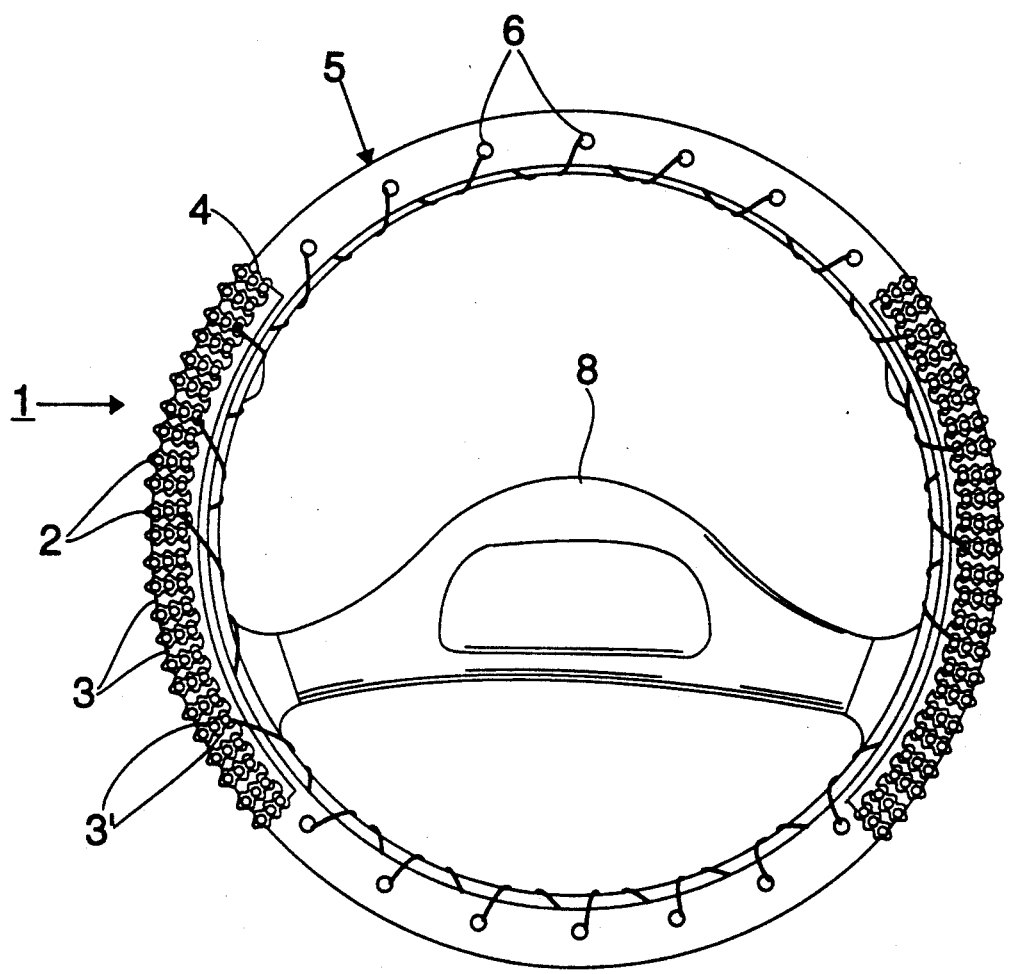
FIG. 3 shows a steering wheel incorporating the wheel cover in accordance with the present invention.

Referring to FIGS. 1 to 3, there is shown a steering wheel cover assembly including a pair of arcuate metal segments 1 held in place around the wheel cover 5. The wheel cover 5 is made of a flexible material such as leather or rubber and is provided with an opening about its inner circumference and a plurality of eyelets 7 adjacent the edges which define the opening. Each of the metal segments is provided with a multiplicity of protrusions 2 disposed in a desired pattern and an array of transverse slots 3 distributed along a length of the metal segments. Each of the transverse slots has at least two pairs of circumferentially opposing recesses 3 which are disposed along a length of the slots. Furthermore, the metal segment 1 includes a plurality of legs 4 at its opposite ends that extend radially inwardly from the body of the metal segment.

In assembly, the metal segment is wrapped around and rivetted to the wheel cover 5. As best shown in FIG. 1, a plurality of rivets 6 fitted in the wheel cover 5 provide eyelets 7 for lacing the cover to the steering wheel and also serve to hold the metal segments 1 in position. FIG. 3 shows the completed steering wheel cover assembly laced to a steering wheel. The transverse slots 3 formed along a length of the metal segment provide the segment with strain relief so that an easier bending and wrapping of the metal segment may be obtained in the process of securing the metal segment onto the outer surface of the wheel cover. In addition, the transverse slots ensure that the inner surface of the metal segment 1 may come close contact with the outer surface of the wheel cover 5, which, in turn, enhances the feeling of contact when the driver grips those portions of the wheel cover which are wrapped by the metal segment 1.

As illustrated in the enlarged portion FIG. 1, each of the transverse slots 3 has a plurality of semicircular recesses 3' that function to accommodate torsional and-/or flexural stress produced in the course of attaching the metal segment to the wheel cover.

A number of legs 4 at the opposite ends extend radially inwardly from the body of the metal segment 1. During the course of securement of the metal segment to the wheel cover, the radial legs 4 will be collapsed and penetrated through the wheel cover 5 so as to prevent the metal segment 1 from peeling off under the action of external forces exerted thereon.

Of course, the multiplicity of protrusions 2 serve to provide enhanced frictional forces between the wheel cover and the palm as well as to massage the fingers and palms of the driver who grasps the steering wheel. This promotes circulation of the blood which would otherwise cause the driver to feel tired during the extended time of driving operation.

Other variations and modifications as are known to those skilled in the art may be resorted to without departing from the scope of the invention as defined by the claims that follow.

What is claimed is:

1. A cover assembly for the steering wheel of an automobile, comprising
   a ring-like steering wheel cover comprising a pair of circumferential inner edges which define an opening therebetween to accommodate the steering wheel and a plurality of spaced eyelets adjacent each inner edge, and
   a ring-like metal member comprising a pair of circumferential inner edges and a plurality of eyelets adjacent each inner edge and spaced substantially equal to the space of said eyelets in said cover, said member being dimensioned to be received on said cover so that the eyelets in the member align with the eyelets in the cover, said member having a multiplicity of outwardly projecting protrusions and an array of transverse slots spaced at a substantially uniform interval around said metal member and extending radially inward toward said inner edges of said member between said protrusions.

2. A steering wheel cover as recited in claim 1, wherein each of said transverse slots has at least two pairs of circumferentially opposing recesses, said pairs of recesses being disposed along a length of said slot.

3. A steering wheel cover as recited in claim 1, further comprising means for releasably attaching the metal member to the wheel cover.

4. A steering wheel cover as recited in claim 3, wherein said attachment means comprises a plurality of rivets, each rivet providing one of said eyelets in said cover and one of said eyelets in said metal member.

* * * * *